US008948489B2

(12) United States Patent
Ikemoto et al.

(10) Patent No.: US 8,948,489 B2
(45) Date of Patent: Feb. 3, 2015

(54) PAPER SHEET RECOGNITION DEVICE AND PAPER SHEET RECOGNITION METHOD

(75) Inventors: Ryo Ikemoto, Hyogo (JP); Kunihiro Ryou, Hyogo (JP); Norikazu Taketani, Hyogo (JP); Masashi Nishikawa, Hyogo (JP)

(73) Assignee: Glory Ltd., Himeji-Shi, Hyogo (JP)

( * ) Notice: Subject to any disclaimer, the term of this patent is extended or adjusted under 35 U.S.C. 154(b) by 254 days.

(21) Appl. No.: 13/521,184

(22) PCT Filed: Jan. 12, 2010

(86) PCT No.: PCT/JP2010/050236

§ 371 (c)(1),
(2), (4) Date: Jul. 9, 2012

(87) PCT Pub. No.: WO2011/086665

PCT Pub. Date: Jul. 21, 2011

(65) Prior Publication Data

US 2012/0275684 A1 Nov. 1, 2012

(51) Int. Cl.
*G06K 9/00* (2006.01)
*G07D 7/20* (2006.01)
*G07D 7/00* (2006.01)

(52) U.S. Cl.
CPC ................ *G07D 7/2058* (2013.01); *G07D 7/00* (2013.01)
USPC .............. 382/135; 209/534; 235/379; 356/71

(58) Field of Classification Search
USPC ......... 382/100, 103, 112, 135, 137–140, 181, 382/190, 195, 199; 194/4; 209/534; 235/379; 356/71; 902/7
See application file for complete search history.

(56) References Cited

U.S. PATENT DOCUMENTS 5,790,693 A 8/1998 Graves et al.
5,947,255 A * 9/1999 Shimada et al. .............. 194/207

(Continued)

FOREIGN PATENT DOCUMENTS

JP 61-110283 5/1986
WO WO 2009072211 A1 6/2009

OTHER PUBLICATIONS

EP Search Report (Application No. 10843024.0—PCT/JP2010/050236) (8 pages—dated Jun. 5, 2013).

*Primary Examiner* — Anand Bhatnagar
(74) *Attorney, Agent, or Firm* — Renner, Kenner, Greive, Bobak, Taylor & Weber

(57) ABSTRACT

A paper-sheet recognition apparatus includes a paper-sheet information acquisition unit that acquires paper-sheet information including an image data of the paper sheet; a candidate narrowing-down unit that narrows down a number of type candidates of the paper sheet to a small number of types based on the image data included in the paper-sheet information; a type determining unit that determines one type from the type candidates narrowed down by the candidate narrowing-down unit based on the image data included in the paper-sheet information; authenticity recognition unit that recognizes authenticity of the paper sheet as to each type candidate narrowed down by the candidate narrowing-down unit; an execution instructing unit that issues an instruction such that the type determining unit and the authenticity recognition unit are operated concurrently; and a final judgment unit that performs a final judgment on the paper sheet by combining the type determined by the type determining unit and authenticity recognition result corresponding to the type from among authenticity recognition results of the candidate types recognized by the authenticity recognition unit.

7 Claims, 10 Drawing Sheets

(56) References Cited

U.S. PATENT DOCUMENTS

| | | | | |
|---|---|---|---|---|
| 7,309,872 | B2 * | 12/2007 | Mukai | 250/559.44 |
| 8,194,933 | B2 * | 6/2012 | Lei et al. | 382/112 |
| 8,712,155 | B2 * | 4/2014 | Tomizawa | 382/181 |
| 2005/0244046 | A1 * | 11/2005 | Yamamoto | 382/135 |
| 2007/0019864 | A1 * | 1/2007 | Koyama et al. | 382/218 |
| 2009/0154778 | A1 * | 6/2009 | Lei et al. | 382/112 |
| 2009/0257641 | A1 | 10/2009 | Liu et al. | |
| 2010/0001452 | A1 | 1/2010 | Watanabe | |
| 2010/0092190 | A1 * | 4/2010 | Numata et al. | 399/45 |
| 2010/0195918 | A1 | 8/2010 | Yonezawa et al. | |
| 2010/0246928 | A1 | 9/2010 | Takahama et al. | |
| 2011/0243422 | A1 * | 10/2011 | Matsuo et al. | 382/139 |
| 2012/0275684 | A1 * | 11/2012 | Ikemoto et al. | 382/135 |

* cited by examiner

FIG.6

| COUNTRY | DENOMINATION | BANKNOTE WIDTH | BANKNOTE LENGTH | BANKNOTE WIDTH LOWER LIMIT | BANKNOTE WIDTH UPPER LIMIT | BANKNOTE LENGTH LOWER LIMIT | BANKNOTE LENGTH UPPER LIMIT | ... |
|---|---|---|---|---|---|---|---|---|
| A | A | 150 | 60 | 145 | 155 | 55 | 65 | |
| | ... | ... | ... | ... | ... | ... | ... | |
| B | B | 155 | 65 | 150 | 160 | 60 | 70 | |
| | C | 120 | 60 | 115 | 125 | 55 | 65 | |
| | ... | ... | ... | ... | ... | ... | ... | |
| ... | ... | ... | ... | ... | ... | ... | ... | |

PAPER SHEET RECOGNITION DEVICE AND PAPER SHEET RECOGNITION METHOD

TECHNICAL FIELD

The present invention relates to a paper-sheet recognition apparatus and a paper-sheet recognition method that recognize a paper sheet. More particularly, the present invention relates to a paper-sheet recognition apparatus and a paper-sheet recognition method having an increased processing speed and a reduced total processing amount of the recognition process of the paper sheet.

BACKGROUND ART

Paper-sheet recognition apparatuses that recognize a type, authenticity, and fitness of paper sheets, such as, banknotes, checks, drafts, and gift coupons are known in the art.

Such paper-sheet recognition apparatuses perform various recognitions such as the type, the authenticity, and the fitness of the paper sheet based on data, etc., that indicates a feature value of the paper sheet detected by using an optical sensor, or the like.

For example, in Patent Document 1, a paper-sheet recognition apparatus is disclosed that captures an image of a paper sheet to be recognized, for example, a banknote, compares a feature pattern of the captured image with a feature pattern of a template stored previously, and recognizes a denomination, authenticity, and fitness of the banknote.

CONVENTIONAL ART DOCUMENTS

Patent Documents

[Patent Document 1] U.S. Pat. No. 5,790,693

DISCLOSURE OF INVENTION

Problem to be Solved By the Invention

In the paper-sheet recognition apparatus disclosed in Patent Document 1, a strip-shaped region in a middle portion of the banknote that is being transported is passed through a narrow aperture of a sensor for sampling. However, if the sampled region is evaluated with a template prepared for the entire surface of the banknote, the recognition process consumes time.

Moreover, the paper-sheet recognition apparatus disclosed in Patent Document 1 repeats the recognition process for each of a plurality of templates for identifying a denomination. Therefore, if there are a large number of templates, the total processing amount of the recognition process increases.

Thus, it has become a major issue as to how to realize a paper-sheet recognition apparatus or a paper-sheet recognition method having an increased processing speed and a reduced total processing amount of the recognition process of the paper sheet.

The present invention is made in view of the above discussion and it is an object of the present invention to provide a paper-sheet recognition apparatus and a paper-sheet recognition method having an increased processing speed and a reduced total processing amount of the recognition process of the paper sheet.

Means for Solving Problem

To solve the above problems and to achieve the above objects, according to an aspect of the present invention, a paper-sheet recognition apparatus that recognizes a paper sheet, includes a paper-sheet recognition apparatus that recognizes a paper sheet, the paper-sheet recognition apparatus comprising: a paper-sheet information acquisition unit that acquires paper-sheet information including an image data of the paper sheet; a candidate narrowing-down unit that narrows down the number of type candidates of the paper sheet to a small number of types based on the image data included in the paper-sheet information; a type determining unit that determines one type from the type candidates narrowed down by the candidate narrowing-down unit based on the image data included in the paper-sheet information; an authenticity recognition unit that recognizes authenticity of the paper sheet as to each of the type candidates narrowed down by the candidate narrowing-down unit; an execution instructing unit that issues an instruction such that the type determining unit and the authenticity recognition unit are operated concurrently; and a final judgment unit that performs a final judgment on the paper sheet by combining the type determined by the type determining unit and an authenticity recognition result corresponding to the type from among authenticity recognition results of the candidate types recognized by the authenticity recognition unit.

According to another aspect of the present invention, the paper-sheet recognition apparatus further includes a fitness recognition unit that recognizes fitness of the paper sheets of the small number of type candidates narrowed down by the candidate narrowing-down unit. The execution instructing unit issues an instruction such that the fitness recognition unit and the type determining unit are operated concurrently.

According to still another aspect of the present invention, the paper-sheet recognition apparatus further includes a code recognizing unit that acquires a partial image of a part including a unique code identifying the paper sheet from the image data, and performs character recognition of the acquired partial image. The execution instructing unit issues an instruction such that the code recognition unit and the type determining unit are operated concurrently.

According to still another aspect of the present invention, in the paper-sheet recognition apparatus, the candidate narrowing-down unit narrows down the number of type candidates based on a shape of the paper sheet.

According to still another aspect of the present invention, in the paper-sheet recognition apparatus, the type determining unit handles the image data in units of blocks of a predetermined size, each block being a set of pixels, and determines one from the small number of type candidates based on the block. The candidate narrowing-down unit handles the image data in the units of blocks, each block being larger than the predetermined size, and narrows down the number of type of the paper sheet based on the block.

According to still another aspect of the present invention, in the paper-sheet recognition apparatus, the candidate narrowing-down unit acquires an amount of features for each wavelength, by irradiating the paper sheet with lights of different wavelengths, and narrows down the number of type of the paper sheet by comparing the amount of features acquired for each wavelength with an amount of features stored previously for each wavelength.

Advantageous Effects of the Invention

According to one aspect of the present invention, in a paper-sheet recognition apparatus and a paper-sheet recognition method, the paper sheet recognition apparatus acquires paper-sheet information that includes an image data of a paper sheet and narrows down the number of candidate types of the paper sheet to a small number of candidate types based on the image data included in the paper-sheet information. In parallel with the type determination process by which one type is determined among the narrowed down type candidates, an authenticity recognition process is executed, that is, the authenticity of the paper sheet as to each narrowed down candidate is recognized, the narrowed-down type candidates being further narrowed-down to the small number of the candidate from the narrowed down type candidates based on the image data included in the paper-sheet information. And a final judgment is performed on the paper sheet by combining the type determined as one type and the authenticity recognition result corresponding to this type from among the recognized authenticity recognition results. Therefore, the recognition processing can be performed speedily and a total processing amount of a recognition process can be reduced.

According to another aspect of the present invention, the paper-sheet recognition apparatus recognizes fitness of the paper sheet as to the small number of narrowed-down type candidates, and issues an instruction such that a fitness recognition process and the type determining process are performed concurrently. By performing the fitness judgment and the type determination concurrently, recognition accuracy is improved and the recognition processing can be performed speedily.

According to still another aspect of the present invention, the paper-sheet recognition apparatus acquires a partial image including a unique code identifying the paper sheet, performs character recognition from the acquired partial image, and issues an instruction such that a code recognition process and the type determining process are performed concurrently. Therefore, the recognition accuracy is improved and the recognition processing can be performed speedily.

According to still another aspect of the present invention, the paper-sheet recognition apparatus narrows down the number of type candidates based on a shape of the paper sheet. Therefore, the type candidates of the paper sheets are efficiently narrowed down.

According to still another aspect of the present invention, the paper-sheet recognition apparatus handles the image data in units of blocks of a predetermined size, each block being a set of pixels, and determines one type for the paper-sheet based on the image data of the block. The paper-sheet recognition apparatus handles the image data in units of blocks, each block being larger than the predetermined size, and narrows down the type of the paper sheet based on the image data of the block. Therefore, the recognition processing can be performed speedily and the total processing amount of the recognition process is reduced.

According to still another aspect of the present invention, the paper-sheet recognition apparatus acquires an amount of features for each wavelength by irradiating the paper sheet with lights of different wavelengths, and narrows down the type candidates of the paper sheet by comparing the amount of features acquired for each wavelength with an amount of features stored beforehand for each wavelength. Therefore, the recognition speed is improved.

BRIEF DESCRIPTION OF DRAWINGS

FIG. 6 is a table showing an example of shape information of banknotes to be recognized.

BEST MODE(S) FOR CARRYING OUT THE INVENTION

Exemplary embodiments of a paper-sheet recognition apparatus and a paper-sheet recognition method according to the present invention are explained in detail below with reference to the accompanying drawings. An overview of the paper-sheet recognition apparatus and the paper-sheet recognition method is explained below with reference to FIGS. 1, 2A, and 2B. The embodiments of the paper-sheet recognition apparatus and the paper-sheet recognition method are explained with reference to FIGS. 3 to 10.

Figure 1:
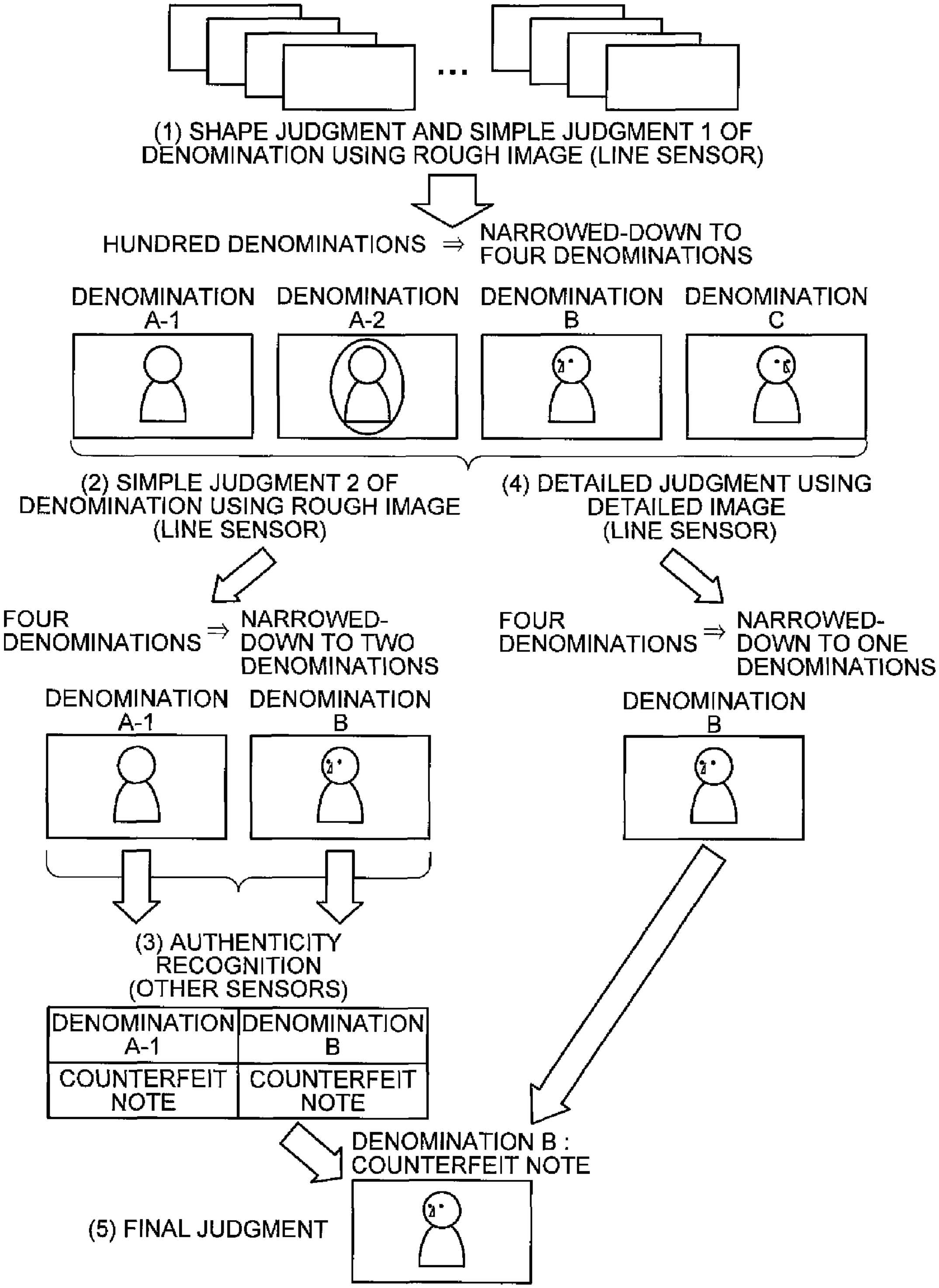
FIG. 1 is a drawing for explaining an overview of a paper-sheet recognition apparatus and a paper-sheet recognition method according to the present invention.

FIG. 1 is a drawing for explaining an overview of the paper-sheet recognition apparatus and the paper-sheet recognition method according to the present invention. In FIG. 1, a case is explained as an example in which the present invention is applied to a paper-sheet recognition apparatus that handles banknotes. However, the present invention can be applied to a paper-sheet recognition apparatus that handles any other paper sheets, such as, checks, drafts, and gift coupons.

In the paper-sheet recognition apparatus and the paper-sheet recognition method according to the present invention, as shown in FIG. 1, a banknote size is detected from a captured image of the banknote, and the number of candidate denominations are narrowed down based on the detected banknote size. Furthermore, in the paper-sheet recognition apparatus and the paper-sheet recognition method, a simple judgment is performed using image data of low resolution (hereinafter, referred to as "rough image") created from image data of the banknote and the number of denomination candidates are further narrowed down to a small number.

Thereafter, based on a high resolution image data (hereinafter, referred to as "detailed image") as to the remaining small number of denomination candidates, a detailed judgment is performed to identify the denomination and the authenticity of the banknote. Moreover, various other recognition processes, such as the authenticity recognition and the fitness recognition of the paper sheet, are performed concurrently with the detailed judgment process based on the detailed image. The processing time required for the simple judgment based on the rough image is of course shorter than the processing time required for the detailed judgment based on the detailed image.

Thus, the main feature according to the present invention is that the number of denomination candidates is first narrowed down by the simple judgment, and then, the detailed judgment is performed as to the remaining small number of denomination candidates. Consequently, the recognition process of the paper sheet can be performed faster and the total processing amount of the recognition process can be reduced.

The above feature is concretely explained below. As shown in (1) of FIG. 1, the paper-sheet recognition apparatus detects the banknote size based on an image of the banknote captured by a line sensor and narrows down the number of denomination candidates based on the banknote size (hereinafter, referred to as "shape judgment").

As shown in (1) of FIG. 1, the paper-sheet recognition apparatus compares a feature pattern of the rough image created from the image data of the banknote captured by the line sensor with a feature pattern of a template stored previously, and narrows down the number of denomination candidates (hereinafter, referred to as "simple judgment 1").

For example, a case is explained in which templates of one hundred denominations are stored previously in the paper-sheet recognition apparatus. The paper-sheet recognition apparatus narrows down the number of the denomination candidates from one hundred to fifty by the shape judgment and further narrows down the number of denomination candidates from fifty to four by the simple judgment 1.

The remaining four denomination candidates sequentially from the top in a judgment result are, namely, a denomination A-1, a denomination A-2, a denomination B, and a denomination C. The denomination A-1 and the denomination A-2 are variations of banknotes of the same denomination. With regard to the denomination A-1 and the denomination A-2, the engravings on the banknotes is similar; however, the feature patterns of the images on the banknotes are different.

Specifically, even if the money value of the banknotes is the same, the banknotes are classified into the denomination A-1 and the denomination A-2 if the feature patterns of the images obtained are different when a light of a certain wavelength is irradiated. Hereinafter, the banknotes having different feature patterns of the images although the monetary amount thereof is the same will be called "series".

As shown in (2) of FIG. 1, the paper-sheet recognition apparatus narrows down the number of denominations from four to two as the judgment result by a simple judgment 2 based on the rough image. Meanwhile, if the four denominations include the denomination of the same series, for example, the denomination A-1 and the denomination A-2, the number of denominations are narrowed down to only one from the same series (in the present example, the denomination A-1) by the simple judgment 2 based on a regional rough image and/or a regional detailed image.

For example, in the judgment method of the simple judgment 2, the judgment can be performed by a pair ink process. The pair ink process is a judgment method in which the feature patterns of the image that are obtained by irradiating lights of two different wavelengths are acquired for two wavelengths, and each feature pattern is compared with a template to narrow down the number of denominations.

As the judgment method of the simple judgment 2, the denomination candidates can be up to the first two judgment results narrowed down and obtained by the simple judgment 1. In this manner, the paper-sheet recognition apparatus narrows down the denomination candidates to two i.e. the denomination A-1 and the denomination B.

As shown in (3) of FIG. 1, the paper-sheet recognition apparatus performs a recognition process other than the denomination recognition process, for each of the two denomination candidates remaining after the simple judgment 2, based on information acquired from sensors (hereinafter, referred to as "other sensors"), such as, a magnetic sensor and a fluorescence sensor, other than the line sensor. Authenticity recognition for recognizing the authenticity of the banknote is explained.

Specifically, the paper-sheet recognition apparatus performs the authenticity recognition as to each of the denomination A-1 and the denomination B. It is assumed here that the paper-sheet recognition apparatus obtains a recognition result as "counterfeit note" when recognition process of the target banknote is performed by assuming it to be of the denomination A-1, or obtains a recognition result as "counterfeit note" when recognition process of the target banknote is performed by assuming it to be of the denomination B.

On the other hand, as shown in (4) of FIG. 1, the paper-sheet recognition apparatus narrows down the four denomination candidates remaining after the simple judgment 1 to one denomination candidate (in the present example, the denomination B) by comparing the feature pattern of the detailed image with the template of each of the four denomination candidates stored previously, and identifies the denomination (hereinafter, referred to as "detailed denomination judgment"). An optical authenticity judgment by the line sensor is also performed in the detailed denomination judgment process. The detailed denomination judgment process and an authenticity recognition process are concurrently performed.

As shown in (5) of FIG. 1, the paper-sheet recognition apparatus performs a final judgment by taking a logical product of the recognition result obtained by the authenticity recognition shown in (3) of FIG. 1 and the narrowed-down denomination candidates obtained as a result of the detailed denomination judgment shown in (4) of FIG. 1. In the present example, because the recognition target banknote is identified as the banknote of the denomination B by the detailed denomination judgment process, the recognition target banknote is judged to be "counterfeit note of denomination B" in the final judgment process.

Thus, in the paper-sheet recognition apparatus and the paper-sheet recognition method, the number of denomination candidates is narrowed down and the detailed denomination judgment process is performed only on the remaining small number of denomination candidates. Therefore, the number of times of the detailed denomination judgment process, which is slower than any of the simple judgment 1 and the simple judgment 2, needs to be performed can be reduced. In the paper-sheet recognition apparatus and the paper-sheet recognition method according to the present invention, the detailed denomination judgment process and the authenticity recognition process are performed concurrently. As a result, the paper sheet can be recognized fast. The total processing amount of the recognition process performed by the paper-sheet recognition apparatus is explained with reference to FIGS. 2A and 2B.

Figure 2A:
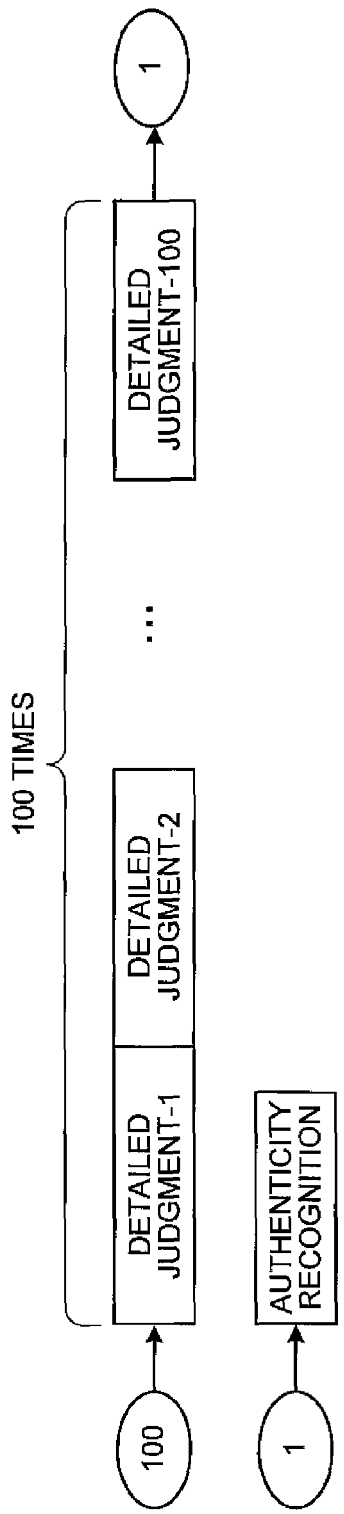
FIGS. 2A and 2B are drawings showing a total processing amount of recognition processes performed by the paper-sheet recognition apparatus according to the present invention.
Figure 2B:
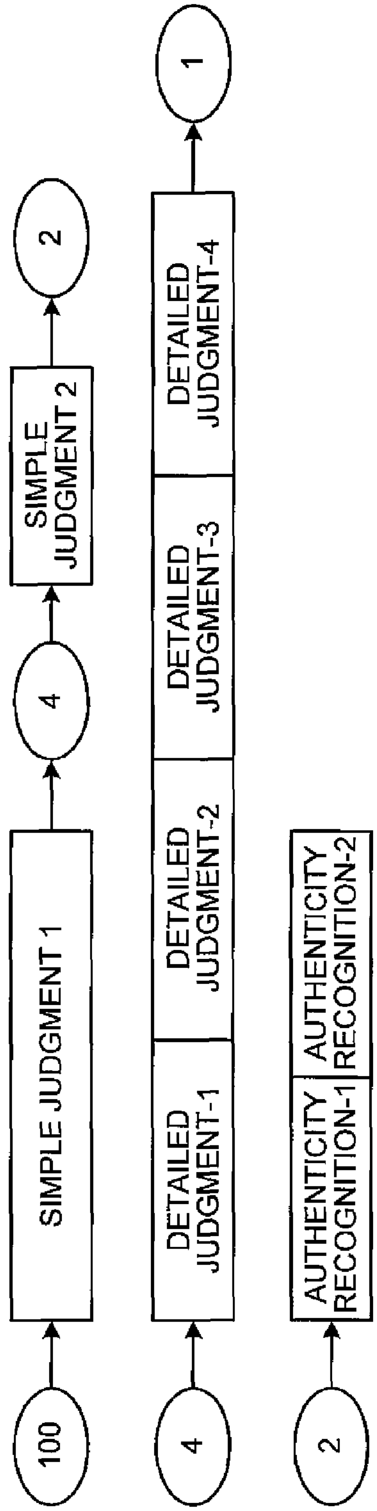

FIGS. 2A and 2B are drawings explaining the total processing amount of the recognition processes performed by the paper-sheet recognition apparatus according to the present invention. FIG. 2A shows a total processing amount of the recognition processes performed by the paper-sheet recognition apparatus according to the conventional technology, and FIG. 2B shows the total processing amount of the recognition processes performed by the paper-sheet recognition apparatus according to the present invention.

First, as shown in FIG. 2A, in the conventional paper-sheet recognition apparatus, the detailed denomination judgment process by which the denomination is identified by comparing the feature pattern of the detailed image with the feature pattern of the template stored previously is performed for all the denomination candidates. In FIG. 2A, a case is explained in which there are one hundred total denomination candidates.

As shown in FIG. 2A, the conventional paper-sheet recognition apparatus, first, in the detailed denomination judgment process, compares templates of all one hundred denomination candidates. That is, the paper-sheet recognition apparatus according to the conventional technology performs the detailed denomination judgment process one hundred times and identifies the denomination, and thereafter, performs the authenticity recognition process for the identified denomination.

On the other hand, as shown in FIG. 2B, the paper-sheet recognition apparatus according to the present invention narrows down the one hundred denomination candidates to a small number of denomination candidates, for example, four denomination candidates by the simple judgment 1 as described above. Subsequently, the paper-sheet recognition apparatus further narrows down the denomination candidates to, for example, two denominations by the simple judgment 2.

Thereafter, the paper-sheet recognition apparatus according to the present invention performs the detailed denomination judgment process only as to the four denomination candidates remaining after the simple judgment 1 and identifies the denomination. Furthermore, the paper-sheet recognition apparatus performs the authenticity recognition process only as to the two denomination candidates remaining after the simple judgment 2.

Therefore, in the paper-sheet recognition apparatus and the paper-sheet recognition method according to the present invention, the number of times of the detailed denomination judgment process, which is slower than any of the simple judgment 1 and the simple judgment 2, is significantly reduced (in FIGS. 2A and 2B, from one hundred times to four times). Consequently, the total processing amount of the recognition process is significantly reduced.

Exemplary embodiments of the paper-sheet recognition apparatus and the paper-sheet recognition method according to the present invention explained with reference to FIGS. 1 and 2A and 2B are explained in detail below.

EMBODIMENTS

Figure 3:
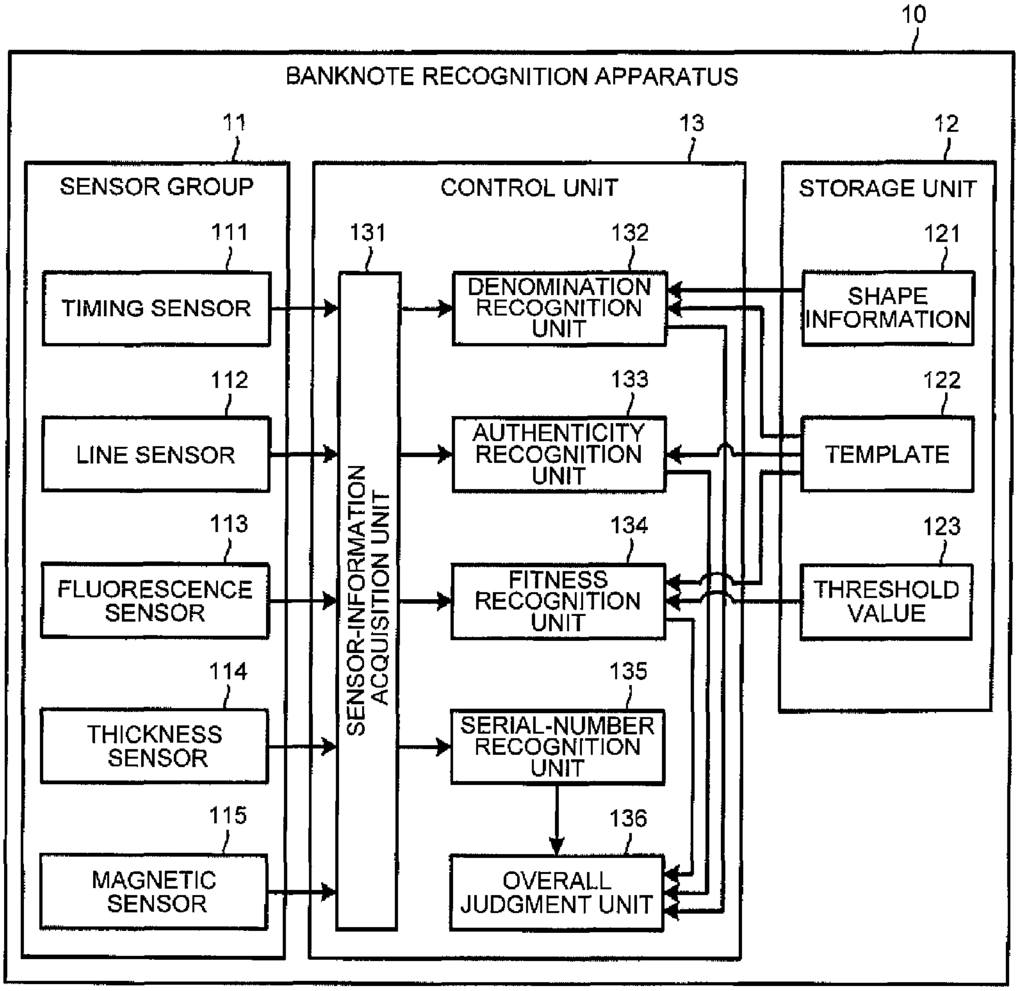
FIG. 3 is a block diagram of a banknote recognition apparatus in an embodiment according to the present invention.

FIG. 3 is a block diagram of a banknote recognition apparatus 10 according to an embodiment according to the present invention. In FIG. 3, only necessary constituent elements are shown for explaining features of the banknote recognition apparatus 10.

As shown in FIG. 3, the banknote recognition apparatus 10 includes a sensor group 11, a storage unit 12, and a control unit 13. The storage unit 12 stores therein shape information 121, templates 122, and threshold values 123. The control unit 13 includes a sensor-information acquisition unit 131, a denomination recognition unit 132, an authenticity recognition unit 133, a fitness recognition unit 134, a serial-number recognition unit 135, and an overall judgment unit 136.

The sensor group 11 is a set of various sensors that are arranged on a transport path through which banknotes deposited from a not shown inlet are transported, and that detect a physical quantity from a measurement target.

Figure 4A:
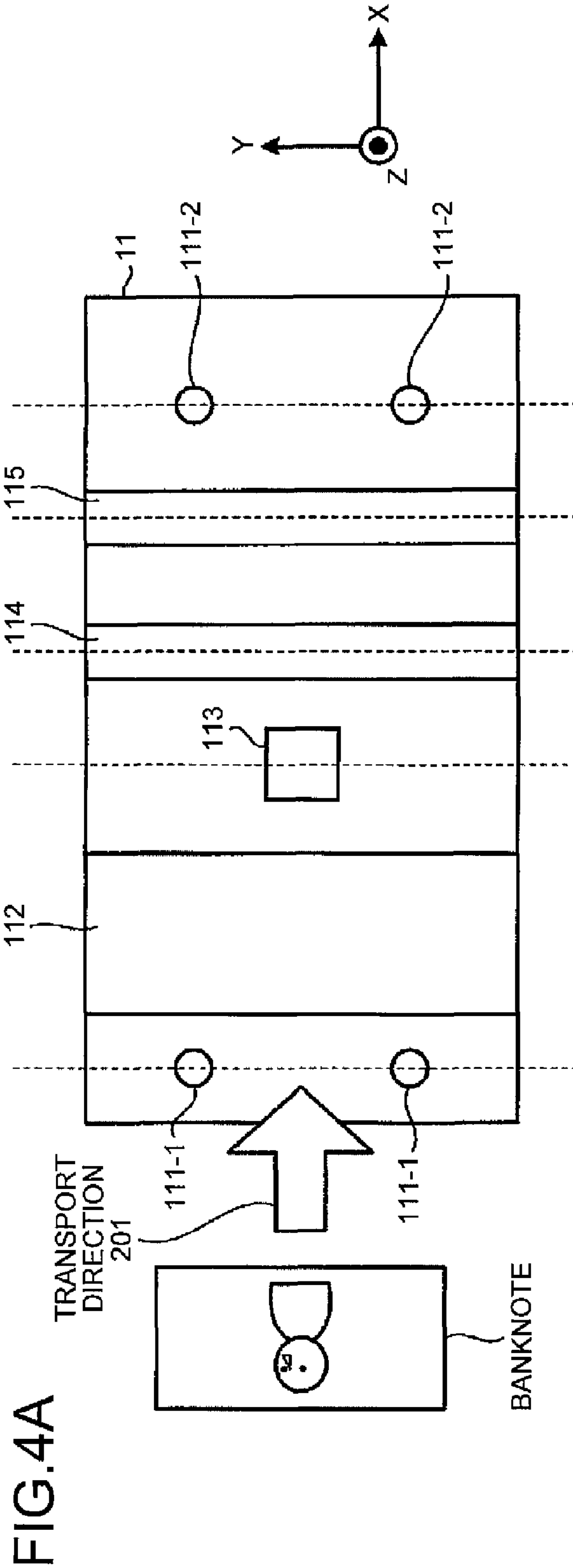
FIGS. 4A and 4B are drawings showing a structural arrangement of a sensor group provided on a transport path in the banknote recognition apparatus.
Figure 4B:
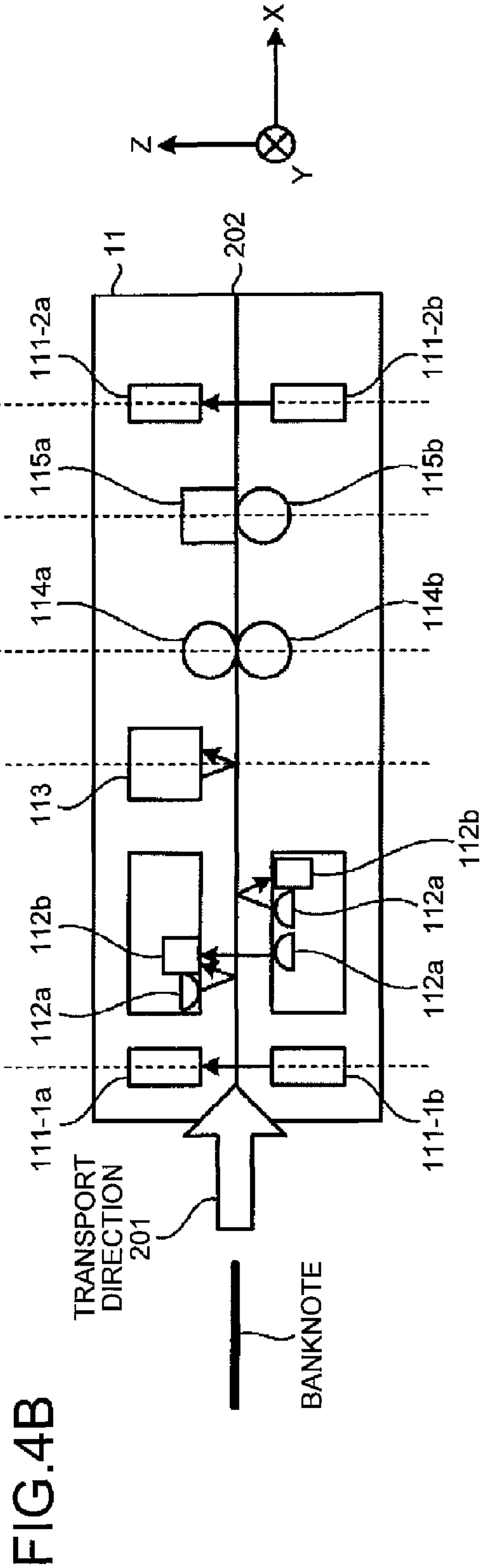

An example of arrangement of the sensor group 11 is explained with reference to FIGS. 4A and 4B. FIGS. 4A and 4B are drawings for explaining the arrangement structure of the sensor group 11 on a transport path 202 in the banknote recognition apparatus 10. In FIGS. 4A and 4B, only necessary constituent elements that are shown for explaining features of the sensor group 11.

FIG. 4A is a top view and FIG. 4B is a side view of the sensor group 11 arranged on the transport path 202. Coordinate axes shown on the right side of FIGS. 4A and 4B are appropriately used in the explanation. Dotted lines in FIGS. 4A and 4B show the same position on the X-axis.

As shown in FIGS. 4A and 4B, the banknote deposited in a not shown inlet is transported in a positive direction of the X-axis and into the sensor group 11 arranged on the transport path 202 (see an arrow 201). Timing sensors 111-1, line sensors 112, a fluorescence sensor 113, a thickness sensor 114, a magnetic sensor 115, and timing sensors 111-2 are sequentially arranged in this order from a front-end portion toward an back-end portion in a transport direction 201. The banknote deposited in the banknote recognition apparatus 10 passes each sensor in the sequence described above.

As shown in FIG. 4B, the timing sensors 111-1 include, for example, an emitting unit 111-1*b* that is arranged on a negative side of the Z-axis of the transport path 202, and a light receiving unit 111-1*a* that is arranged on the positive side of the Z-axis. The light emitting unit 111-1*b* emits an infrared light and the light receiving unit 111-1*a* receives the infrared light.

The moment a leading edge of the banknote passes the timing sensors 111-1, i.e., the infrared light emitted from the light emitting unit 111-1*b* is blocked by the banknote. This indicates that the timing sensors 111-1 detect a commencement of passage of the banknote.

The moment a trailing edge of the banknote passes the timing sensors 111-1, the blocking of the infrared light during the passage of the banknote is detected by the light receiving unit 111-1*a*, which is indicative of the timing sensors 111-1 detecting end of passage of the banknote.

As shown in FIG. 4B, the line sensor 112 includes light emitting units 112*a* that emit a green light, an infrared light, etc., on a front-face side and a back-face side of the banknote passing over the transport path 202.

The line sensor 112 includes light receiving units 112*b* on the front-face side and the back-face side of the banknote passing over the transport path 202. The light receiving units 112*b* receive a light emitted from the light emitting units 112*a* and transmitted through the banknote (hereinafter, referred to as "transmitted light"), and a light that is emitted from the light emitting units 112*a* and reflected by the banknote surface (hereinafter, referred to as "reflected light"). In the line sensor 112, a combination of the light emitting units 112*a* and the light receiving units 112*b* is arranged side-by-side in a direction perpendicular to the transport direction of the banknote.

The light emitting units 112*a* irradiate the banknote with the green light, the infrared light, etc., the light receiving units 112*b* receive the transmitted light or the reflected light, and based on the received transmitted light or the reflected light, the line sensor 112 generates an image data. Specifically, the line sensor 112 detects the banknote size by acquiring a shape of the banknote using the transmitted light, and detects the feature pattern on the front-face side and the back-face side of the banknote using the reflected light.

A white seal is pasted on a surface of a end portion of the line sensor 112 for an adjustment, and an amount of the irradiated light is adjusted based on the reflected light of the seal. Meanwhile, it is allowable to resin the opposite side of the light emitting units 112*a* across the transport path 202, and detect a reflected light reflected by the resin, and adjust the amount of the irradiated light based on the detected reflected light. For example, a mirror-polished gray resin can be arranged to detect the light for the adjustment.

The fluorescence sensor 113 includes an light emitting unit that emits an ultraviolet light, and a light receiving unit that can receives a reflected light of the emitted light. The light emitting unit and the light receiving unit are arranged on, for example, a positive side of the Z-axis of the transport path 202. The fluorescence sensor 113 detects a fluorescent component included in the banknote based on the reflected light received by the light receiving unit.

The thickness sensor 114 includes detection shafts that are arranged in a direction perpendicular to the transport direction of the banknote so as to sandwich the banknote passing over the transport path 202. Among the detection shafts, a detection shaft 114*a* is movable in the positive and negative directions of the Z-axis whereas a detection shaft 114*b* is fixed.

The thickness sensor 114 detects the thickness of the banknote including the thickness of an ink layer on the banknote by detecting displacement of the detection shaft 114*a* based on the passage of the banknote between the detection shafts 114*a* and 114*b*.

The magnetic sensor 115 includes a magnetic head 115*a* and a roller 115*b*. The magnetic head 115*a* is arranged, for example, on the positive side of the Z-axis of the transport path 202, and detects magnetic intensity of a magnetic field. The roller 115*b* is arranged on the negative side of the Z-axis, and pushes the banknote against the magnetic head 115*a*. The magnetic head 115*a* is extendable in a direction perpendicular to the transport direction of the banknote.

That is, the magnetic head 115*a* detects a magnetic field generated by the banknote when passing over the transport path 202, and as a result, the magnetic sensor 115 detects data that indicates magnetic distribution.

The timing sensors 111-2 are sensors that are arranged on the back-end side of the sensor group 11 in the transport direction 201. Because the timing sensors 111-2 have the same functions as those of the timing sensors 111-1, the explanation thereof is omitted.

In the present embodiment, as shown in FIGS. 4A and 4B, the banknote passes the sensor group 11 with a long-edge portion thereof parallel to the X-axis. In an alternative arrangement, the banknote can be made to pass the sensor group 11 with a short-edge portion thereof parallel to the X-axis.

Returning to FIG. 3 and the explanation of the banknote recognition apparatus 10, the sensor group 11 includes a timing sensor 111, the line sensor 112, the fluorescence sensor 113, the thickness sensor 114, and the magnetic sensor 115 are provided as described above. All the sensors in the sensor group 11 collectively transfer detected sensor information to the sensor-information acquisition unit 131.

The storage unit 12 is constituted by a storage device such as a non-volatile memory or a hard disk drive. The storage unit 12 stores therein information relating to the banknote size as the shape information 121, in a correlated form with the country and the denomination of the banknote.

The storage unit 12 stores therein country-wise and denomination-wise feature patterns of the banknote as the templates 122, and the threshold values 123 that are required when performing the recognition processes by the authenticity recognition unit 133 and the fitness recognition unit 134. The shape information 121 and the threshold values 123 are described in detail later.

The control unit 13 performs overall control of the banknote recognition apparatus 10. For example, the control unit 13 issues instructions to the authenticity recognition unit 133, the fitness recognition unit 134, and the serial-number recognition unit 135 to concurrently perform the recognition processes while the recognition process is being performed by the denomination recognition unit 132. Meanwhile, it is not necessary that any two or all of the recognition processes of the authenticity recognition unit 133, the fitness recognition unit 134, and the serial-number recognition unit 135 be performed concurrently. It is sufficient that the recognition process performed by any of the authenticity recognition unit 133, the fitness recognition unit 134, and the serial-number recognition unit 135 be performed concurrently with the detailed denomination judgment process performed by the denomination recognition unit 132.

The sensor-information acquisition unit 131 receives the sensor information detected by each sensor in the sensor group 11, and sends appropriate sensor information to an appropriate recognition unit in the control unit 13.

The denomination recognition unit 132 performs the denomination recognition process based on the sensor information received from the sensor-information acquisition unit 131. The detailed structure of the denomination recognition unit 132 is explained with reference to FIG. 5.

Figure 5:
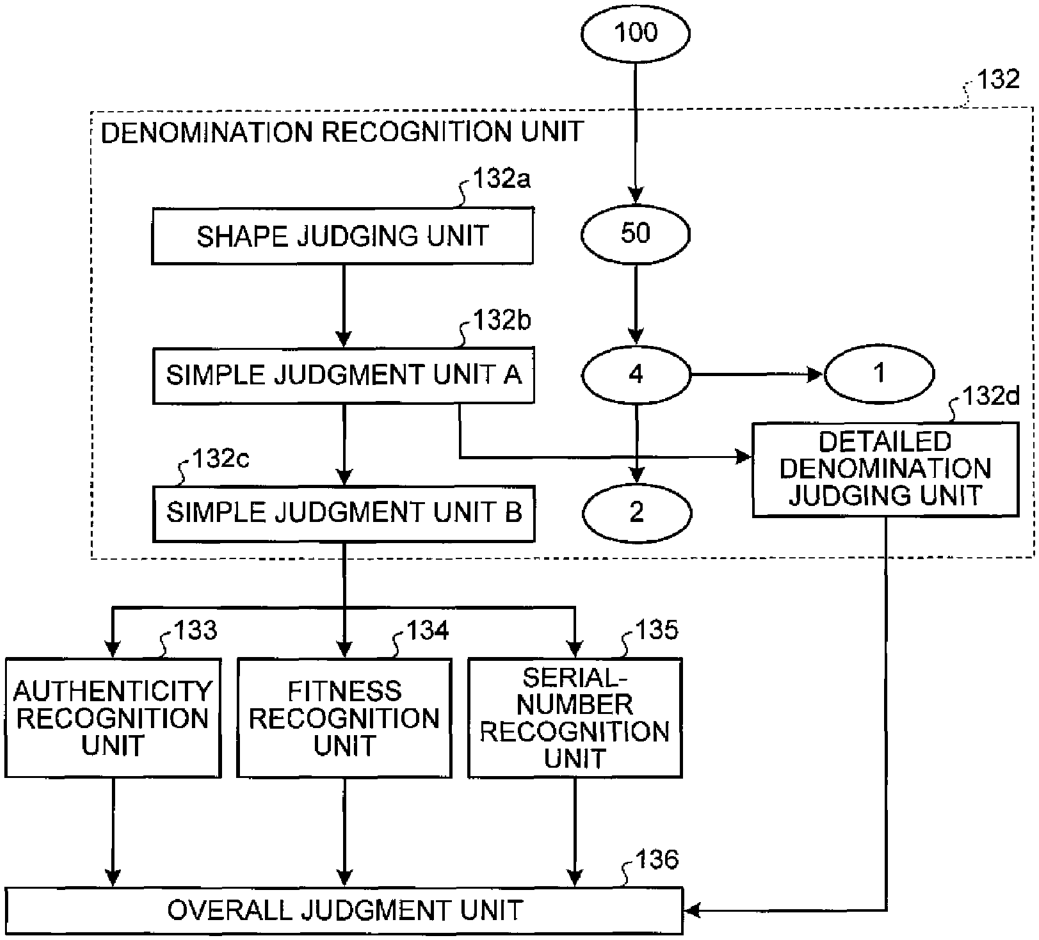
FIG. 5 is a drawing showing a structure of a denomination recognition unit.

FIG. 5 is a drawing explaining a structure of the denomination recognition unit 132. In FIG. 5, the denomination recognition unit 132 enclosed by the dotted-line is explained. The denomination recognition unit 132 includes a shape judging unit 132*a*, a simple judgment unit A 132*b*, a simple judgment unit B 132*c*, and a detailed denomination judging unit 132*d*.

The shape judging unit 132*a* detects the size of the banknote based on the image of the banknote acquired by the line sensor 112, and narrows down the number of denomination candidates by using judgment conditions stored in the shape information 121. Concrete judgment conditions are described in detail later.

The simple judgment unit A 132*b* creates a rough image based on the image data of the banknote captured by the line sensor 112. Thereafter, the simple judgment unit A 132*b* narrows down the number of denomination candidates by comparing the feature pattern of the rough image with the feature patterns of the templates 122 stored previously.

As shown in FIG. 5, the shape judging unit 132*a* narrows down the number of the denomination candidates from one hundred to fifty and the simple judgment unit A 132*b* further narrows down the number of denomination candidates from fifty to four.

Subsequently, the simple judgment unit B 132*c* further narrows down the number of denomination candidates narrowed down by the simple judgment unit A 132*b*. In the present embodiment, the simple judgment unit B 132*c* narrows down the number of denomination candidates from four to the first two of the denomination candidates of the judgment result obtained by the simple judgment unit A 132*b*.

If the four denomination candidates include the denominations of the same series, the simple judgment unit B 132*c* narrows down the denomination candidates to two denomination candidates. One is selected from the same series by the pair ink process, etc., based on the rough image, and the other is the first denomination candidate from the denomination candidates other than the same series.

Thereafter, each of the authenticity recognition unit 133, the fitness recognition unit 134, and the serial-number recognition unit 135 performs the recognition process as to the two denomination candidates narrowed down by the denomination recognition unit 132. The authenticity recognition unit 133, the fitness recognition unit 134, and the serial-number recognition unit 135 are described in detail later.

The detailed denomination judging unit 132*d* identifies the denomination by comparing the feature pattern of the detailed image with the feature patterns of the templates 122, of each of the four denomination candidates narrowed down by the simple judgment unit A (132*b*), stored previously. The detailed denomination judging unit 132*d* not only performs the denomination judgment but also performs the authenticity judgment based on the data of reflected light obtained by using lights of a plurality of wavelength including a visible light. If the resolution of the detailed image data is higher than the resolution of the rough image, the resolution of the detailed image data can be lower than the resolution of the image data of the banknote captured by the line sensor 112.

Thereafter, the overall judgment unit 136 performs an overall judgment by taking a logical product of the denominations identified by the detailed denomination judging unit 132*d* and the recognition result obtained by each of the recognition units. The overall judgment unit 136 is described in detail later.

The number of denomination candidates are narrowed down to four by the simple judgment unit A 132*b* and further narrowed down to two by the simple judgment unit B 132*c*. However, the number of candidates can be changed to any number depending on a speed of the processing unit of the banknote recognition apparatus 10 and a transport speed of the banknote.

Returning to FIG. 3 and the explanation of the banknote recognition apparatus 10, the authenticity recognition unit 133 perform the authenticity recognition process on the banknote based on the denomination candidates narrowed down by the simple judgment unit B 132*c* of the denomination recognition unit 132.

Specifically, when the simple judgment unit B 132*c* narrows down the denomination candidates to two, that is, a denomination A and a denomination B, the authenticity recognition unit 133, first, subjects the denomination A to the following process. Assuming denomination of the banknote to be recognized is the denomination A, the authenticity recognition unit 133 performs recognition process as to whether the banknote is a genuine note or a counterfeit note based on the sensor information that is detected by each sensor in the sensor group 11 and received by the sensor-information acquisition unit 131. Thereafter, the authenticity recognition unit 133 subjects the denomination B to a similar process. An authenticity judgment process is described in detail later.

The fitness recognition unit 134 is a processing unit that performs a fitness recognition process based on the denomination candidates narrowed down by the simple judgment unit B 132*c* of the denomination recognition unit 132. Specifically, when the denomination candidates are narrowed down to two, that is, the denomination A and the denomination B by the simple judgment unit B 132*c*, similarly to the authenticity recognition unit 133, the fitness recognition unit 134, first, subjects the denomination A to the following process.

Assuming denomination of the banknote to be recognized is the denomination A, the fitness recognition unit 134 performs recognition process as to whether the banknote is a fit note or an unfit note based on the thickness of the banknote and the ink layer detected by the thickness sensor 114. Thereafter, the fitness recognition unit 134 subjects the denomination B to a similar process. Because a recognition method performed by the fitness recognition unit 134 is similar to that performed by the authenticity recognition unit 133 described above, the explanation thereof is omitted.

The serial-number recognition unit 135 performs a serial-number recognition process of the banknote based on the denomination candidates narrowed down by the simple judgment unit B 132*c* of the denomination recognition unit 132. Specifically, when the number of denomination candidates is narrowed down to two, that is, the denomination A and the denomination B, similarly to the authenticity recognition unit 133, the serial-number recognition unit 135, first, subjects the denomination A to the following process.

A serial number is a unique identification code assigned for the banknote to be recognized. Because a printing position of the serial number differs for each denomination, information relating to the printing position of the serial number is stored previously in the storage unit 12 for each denomination and transport-direction.

The serial-number recognition unit 135 acquires the printing position of the serial number of the denomination candidate of the denomination A, extracts an image of a portion of the serial number from an image acquired by a not shown image sensor, and recognizes the serial number based on the extracted image.

Thereafter, the serial-number recognition unit 135 subjects the denomination B to a similar process. The serial-number recognition unit 135 recognizes the serial number by using the image acquired by the image sensor. In an alternative arrangement, the serial-number recognition unit 135 can recognize the serial number based on the image acquired by the line sensor 112. A denomination identification process performed by the detailed denomination judging unit 132*d*, the authenticity recognition process performed by the authenticity recognition unit 133, the fitness recognition process performed by the fitness recognition unit 134, and the serial-number recognition process performed by the serial-number recognition unit 135 are performed concurrently.

The overall judgment unit 136 is a processing unit that performs an overall judgment process by taking a logical product of the denomination identified by the detailed denomination judging unit 132*d* and the recognition result obtained by each of the recognition unit. Specifically, a case is explained in which the denomination identified by the detailed denomination judging unit 132*d* is the denomination B, and judged as "genuine note".

The simple judgment unit B 132*c* narrows down the denomination candidates to the denomination A and the denomination B. The authenticity recognition unit 133 obtains a recognition result as "counterfeit note" when recognition of the banknote is performed by assuming it to be of the denomination A, and obtains a recognition result as "genuine note" when recognition of the banknote is performed by assuming it to be of the denomination B.

In this case, the overall judgment unit 136 obtains a logical product of both the recognition results, that is, judges that the recognition target banknote is "genuine note of denomination B". In the present embodiment, the recognition result of the authenticity recognition unit 133 is explained; however, a similar process is performed for the recognition results of the fitness recognition unit 134 and the serial-number recognition unit 135. Therefore, the overall judgment unit 136 performs a judgment process by using a fitness recognition result and a serial-number recognition result of the denomination (denomination B) judged by the detailed denomination judging unit 132*d* and outputs a result as an overall judgment result.

The concrete judgment conditions stored in the shape information 121 are explained below with reference to FIG. 6. FIG. 6 is a table for explaining an example of the shape information 121.

As shown in FIG. 6, the shape information 121 includes items, namely, "country", "denomination", "banknote width", "banknote length", "banknote width lower limit", "banknote width upper limit", "banknote length lower limit", and "banknote length upper limit".

The item "country" is a name of the country in which the banknote is issued, and is the information for recognizing the banknote. In European countries, because there is a case that a common banknote is used in member countries, the item "country" can be a currency unit instead of the name of the country.

The item "denomination" is an amount that imparts value to the banknote that is set for each "country". For example, if "country" is "Japan", denominations are "1000 Yen", "5000 Yen", etc. If "country" is "USA", the denominations are "5 US dollars", "10 US dollars", etc.

The item "banknote width" is a length of a long-edge side of the banknote of "country" and "denomination". The item "banknote length" is a length of a short-edge side of the banknote. In this example, all the lengths are indicated in the unit of millimeters.

The items "banknote width lower limit" and "banknote width upper limit" are threshold values of the banknote widths. The denomination of a banknote is judged to be the denomination candidate if the banknote width obtained from the banknote size detected based on the banknote image captured by the line sensor 112 is greater than or equal to "banknote width lower limit" of the denomination candidate and smaller than or equal to "banknote width upper limit" of the denomination candidate.

Similar to the items "banknote width lower limit" and "banknote width upper limit", the items "banknote length lower limit" and "banknote length upper limit" are threshold values of the banknote lengths used when judging the denomination candidates. Thus, the shape judging unit 132*a* performs a shape judgment process based on the judgment conditions included in the shape information 121.

The shape information 121 includes the upper limits and the lower limits of the banknote width and the banknote length. In an alternative arrangement, instead of concretely specifying the threshold values of the banknote size, the following scheme can be employed. That is, if a difference between the item "banknote width" and the actual detected banknote width and a difference between the item "banknote length" and the actual detected banknote length is respectively less than or equal to respective predetermined threshold values, a judgment can be made that the banknote is of the denomination candidate and the denomination candidates can be narrowed down.

Figure 7A:
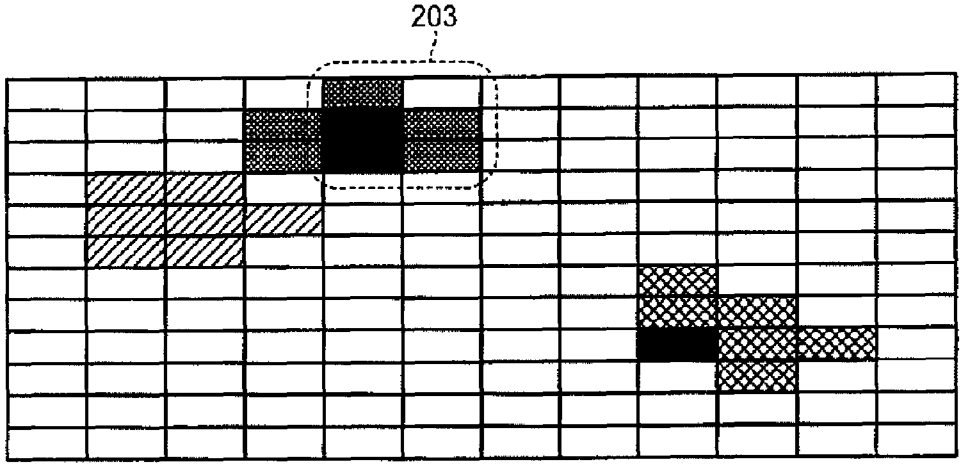
FIGS. 7A and 7B are drawings showing a detailed image and rough image of a banknote.

The detailed image and the rough image of the banknote are explained with reference to FIGS. 7A and 7B. FIG. 7A shows the detailed image and FIG. 7B shows the rough image.

The rough image is an image data having a lower resolution than that of the image data of the banknote captured by the line sensor 112. A process, which is performed by the simple judgment unit A 132*b*, and by which the rough image is created based on the captured image data of the banknote, is explained by focusing on a predetermined area 203 of the image data.

As shown in FIG. 7A, the simple judgment unit A 132*b* calculates an average value of an image data constituted by the number of pixels in the predetermined area 203 of the image data of the banknote captured by the line sensor 112. If the image data is the data that indicates color, brightness, etc., and the number of pixels in the predetermined area 203 is, for example, six, the simple judgment unit A 132*b* calculates the average value of the image data constituted by the six pixels.

Figure 7B:
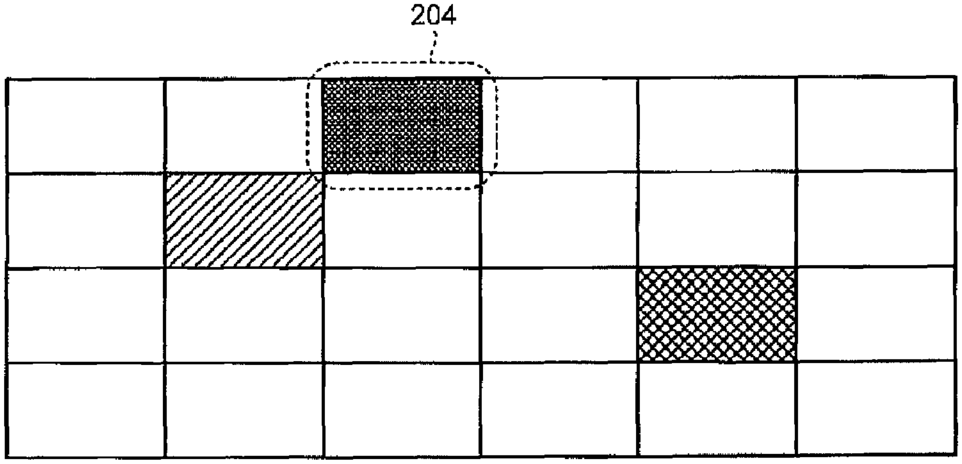

As shown in FIG. 7B, the calculated average value of the image data constituted by the six pixels is treated as an image data of a single block 204 in the rough image. Thus, when performing the judgment based on the rough image, the total number of pixels required for comparing the rough image and the templates 122 stored previously can be significantly reduced. Therefore, as compared to a case in which the detailed judgment is performed based on the detailed image, a total processing time and a total processing amount can be reduced when performing the simple judgment based on the rough image.

Figure 8A:
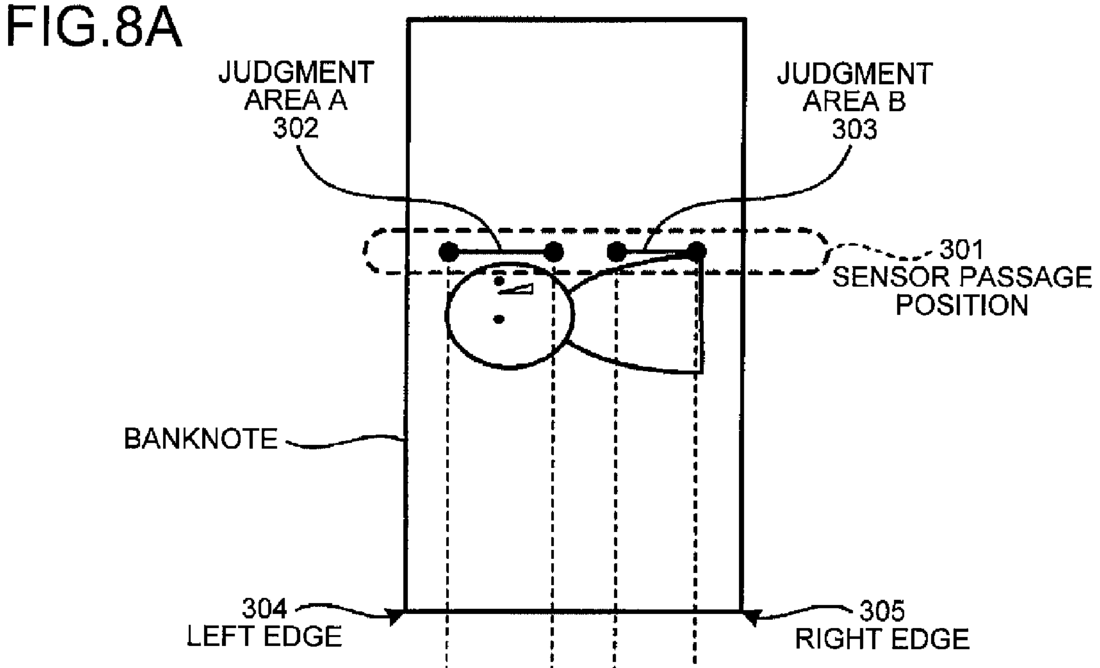
FIGS. 8A and 8B are drawings showing examples of an authenticity recognition process performed by the banknote recognition apparatus.
Figure 8B:
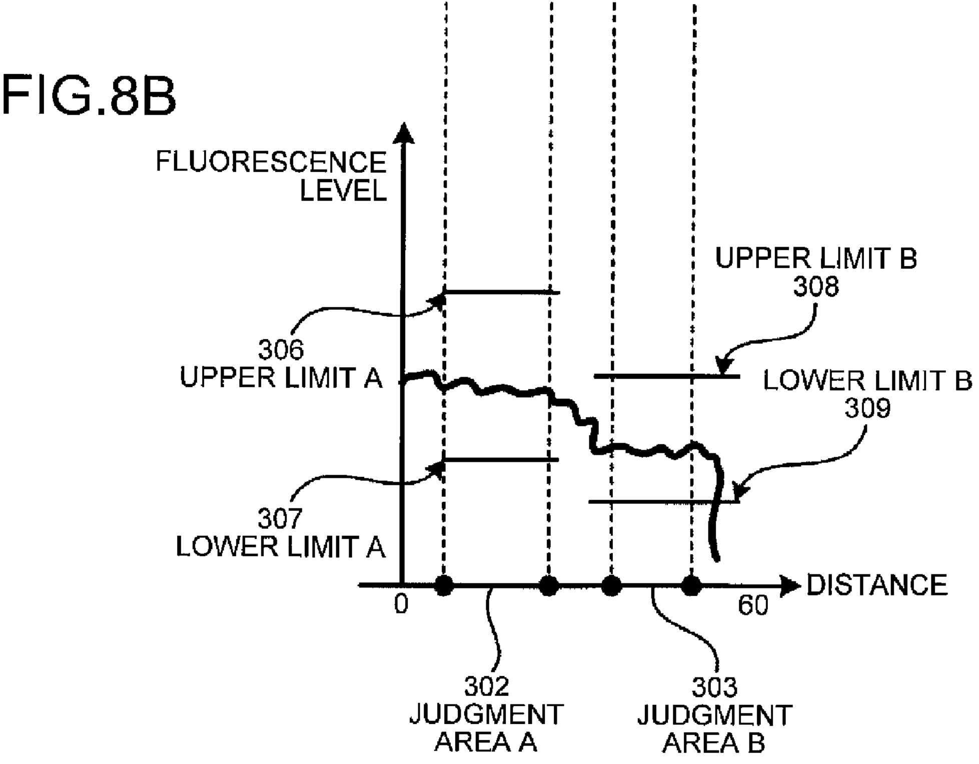

A recognition method, which is performed by the authenticity recognition unit 133 and used for recognizing the authenticity based on the sensor information detected by the fluorescence sensor 113, is explained below with reference to FIGS. 8A and 8B. FIGS. 8A and 8B are drawings for explaining an example of the authenticity recognition process performed by the banknote recognition apparatus 10.

FIG. 8A shows the banknote to be recognized and FIG. 8B shows the threshold values 123 of a fluorescence level. The fluorescence level indicates an amount of the fluorescent component detected by the fluorescence sensor 113.

A judgment target area for each combination of a denomination and a transport direction, and the threshold values 123 of the fluorescence level of the judgment target area are preset in the storage unit 12. Specifically, as shown in FIG. 8A, a case is explained in which a direction perpendicular to the transport direction is parallel with the long-edge direction of the banknote, and a passage position above the fluorescence sensor 113 is a dotted line enclosure 301.

For example, if the denomination candidate is the denomination A, the judgment target areas corresponding to the sensor passage position 301 shown in FIG. 8A for judging the fluorescence level are preset as a judgment area A 302 and a judgment area B 303.

As shown in FIG. 8B, the threshold values 123 of the fluorescence level of the judgment area A 302 are an upper limit A 306 and a lower limit A 307. The threshold values 123 of the fluorescence level of the judgment area B 303 are an upper limit B 308 and a lower limit B 309. The X-axis of a graph shown in FIG. 8B represents a distance from a left edge 304 of the banknote to a right edge 305 where the long-edge direction from the left edge 304 of the banknote is zero. The Y-axis of the graph represents the fluorescence level.

A result shown in the graph in FIG. 8B indicates the fluorescence levels detected by the fluorescence sensor 113. In this case, because the fluorescence levels of both the judgment area A 302 and the judgment area B 303 are within the range of the threshold values 123, the authenticity recognition unit 133 judges the levels in the judgment areas are of "genuine note" as the judgment result.

Thus, the authenticity recognition unit 133 performs the authenticity judgment process on each judgment target area that is set for each combination of a denomination and a transport direction based on the sensor information detected by the fluorescence sensor 113. The judgment results obtained based on the sensor information of the sensors other than the fluorescence sensor 113 are also used for performing the authenticity recognition process.

For example, the sensor information of the sensors other than the fluorescence sensor 113 includes sensor information detected by the thickness sensor 114, the magnetic sensor 115, etc. The recognition method, which is performed by the authenticity recognition unit 133 and is performed based on the sensor information detected by the thickness sensor 114 and the magnetic sensor 115, is similar to the recognition method that is performed based on the fluorescence sensor 113.

With regard to the thickness sensor 114, the authenticity recognition unit 133 judges whether the thickness of the banknote and the thickness of the ink layer detected by the thickness sensor 114 is within the range of the threshold values 123 of the thickness of the judgment target area preset for each denomination and transport direction.

With regard to the magnetic sensor 115, the authenticity recognition unit 133 judges whether a magnetic intensity detected by the magnetic sensor 115 is within the range of the threshold values 123 of the magnetic intensity of the judgment target area preset for each denomination and transport direction.

Figures 9A, 9B, 9C:
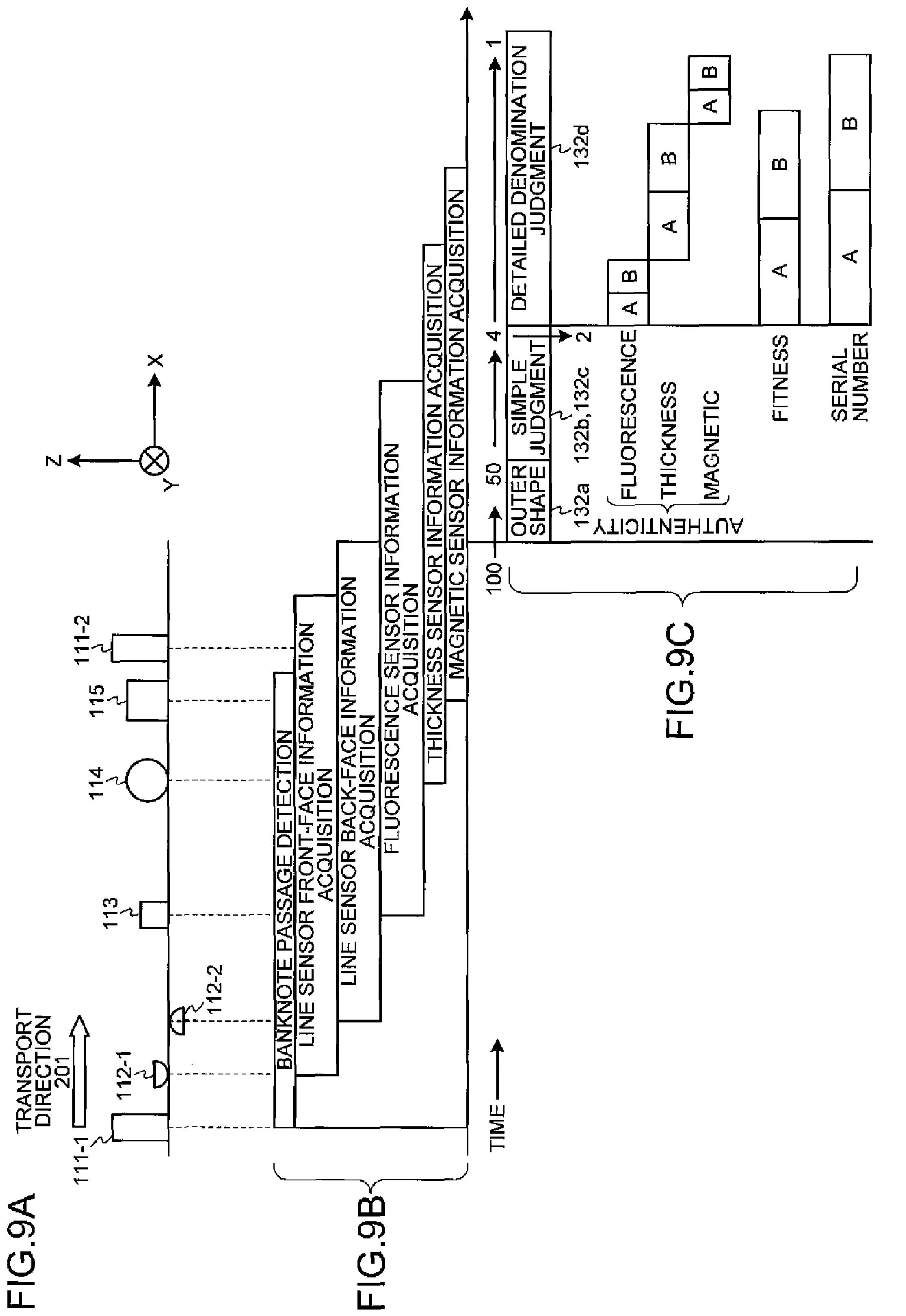
FIGS. 9A, 9B, and 9C are time charts of processes performed by the banknote recognition apparatus.

A timing of sensor information acquisition performed by the sensor group 11 and a timing of each recognition process performed by the control unit 13 are explained with reference to FIGS. 9A, 9B, and 9C. FIGS. 9A, 9B, and 9C are time-charts of processes performed by the banknote recognition apparatus 10.

FIG. 9A shows a front view of the arrangement structure of the sensor group 11. FIG. 9B shows the timing of sensor information acquisition performed by the sensor-information acquisition unit 131. FIG. 9C shows the timing of each recognition process performed by the control unit 13. The coordinate axes shown on the right side in FIGS. 9A, 9B, and 9C are appropriately used in the explanation below.

As shown in FIG. 9A, the transport direction 201 of the recognition target banknote is the positive direction of the X-axis. The banknote is transported such that the front-face thereof is facing towards the positive direction side of the Z-axis and the back-face thereof is facing towards the negative direction side of the Z-axis. The X-axis in FIGS. 9A and 9B represents a time axis. The dotted lines in FIGS. 9A, 9B, and 9C show a position of each sensor in the sensor group 11, and a time at which a leading edge of the banknote passes the sensor group 11.

FIG. 9B shows that the sensor-information acquisition unit 131 detects that the banknote is passing the timing sensor 111-1 from the time the leading edge of the banknote passes the timing sensor 111-1 till the time the trailing edge of the banknote passes the timing sensor 111-1.

The moment the leading edge of the banknote passes the line sensor (front-face side) 112-1, the line sensor 112-1 (front-face side) starts acquiring the sensor information of the front-face side of the banknote. Furthermore, the moment the leading edge of the banknote passes a line sensor (back-face side) 112-2, the line sensor (back-face side) 112-2 starts acquiring the sensor information of the back-face of the banknote. The same holds true for the fluorescence sensor 113, the thickness sensor 114, and the magnetic sensor 115.

The moment the leading edge of the banknote passes each sensor, the sensor group 11 acquires sensor information from the each sensor. However, at the moment the leading edge of the banknote passes the timing sensor 111-1, the sensor-information acquisition unit 131 can perform the following processes.

The sensor-information acquisition unit 131 calculates a time at which the leading edge of the banknote passes each sensor as a scheduled passage time based on the distance from the position of the timing sensor 111-1 on the X-axis to the position of each sensor and the transport speed of the banknote. Thereafter, each sensor can start acquiring the sensor information based on the scheduled passage time calculated by the sensor-information acquisition unit 131.

The moment the sensor information of the front-face and the back-face of the banknote is acquired by the line sensor (front-face side) 112-1 and the line sensor (back-face side) 112-2, respectively, as shown in FIG. 9C, the control unit 13 issues an instruction to the shape judging unit 132*a* to perform the shape judgment process.

Thus, even if the sensor information is still being acquired by the fluorescence sensor 113, the thickness sensor 114, and the magnetic sensor 115, the control unit 13 issues an instruction to concurrently perform the shape judgment process and the simple judgment process.

The control unit 13 issues an instruction to the detailed denomination judging unit 132*d* to perform the detailed denomination judgment process at the moment the denominations are narrowed down to four denominations by the simple judgment unit A 132*b*. Furthermore, the control unit 13 issues instructions to the authenticity recognition unit 133, the fitness recognition unit 134, and the serial-number recognition unit 135 to perform the recognition processes concurrently with the detailed denomination judgment process at the moment the denominations are narrowed down to two denominations by the simple judgment unit B 132*c*.

It is not necessary that all of the recognition processes be performed concurrently by the authenticity recognition unit 133, the fitness recognition unit 134, and the serial-number recognition unit 135. It is sufficient that the recognition process performed by any two or more out of the authenticity recognition unit 133, the fitness recognition unit 134, and the serial-number recognition unit 135 are performed concurrently with the detailed denomination judgment process.

As shown in FIG. 9C, the reference symbols A and B denote the denominations. The authenticity recognition unit 133, the fitness recognition unit 134, and the serial-number recognition unit 135 perform the recognition processes as to each of the denomination A and the denomination B.

Thus, the control unit 13 issues an instruction to each of the recognition units to perform the recognition process at the moment that the information required for performing the recognition process is acquired by the corresponding recognition unit. Therefore, even if the sensor information is still being acquired by each sensor, the shape judgment process can be performed concurrently. Furthermore, the detailed denomination judgment process, the authenticity recognition process, the fitness recognition process, and the serial-number recognition process can be performed concurrently. Consequently, the banknote recognition apparatus 10 can speedily perform the denomination recognition process.

Figure 10:
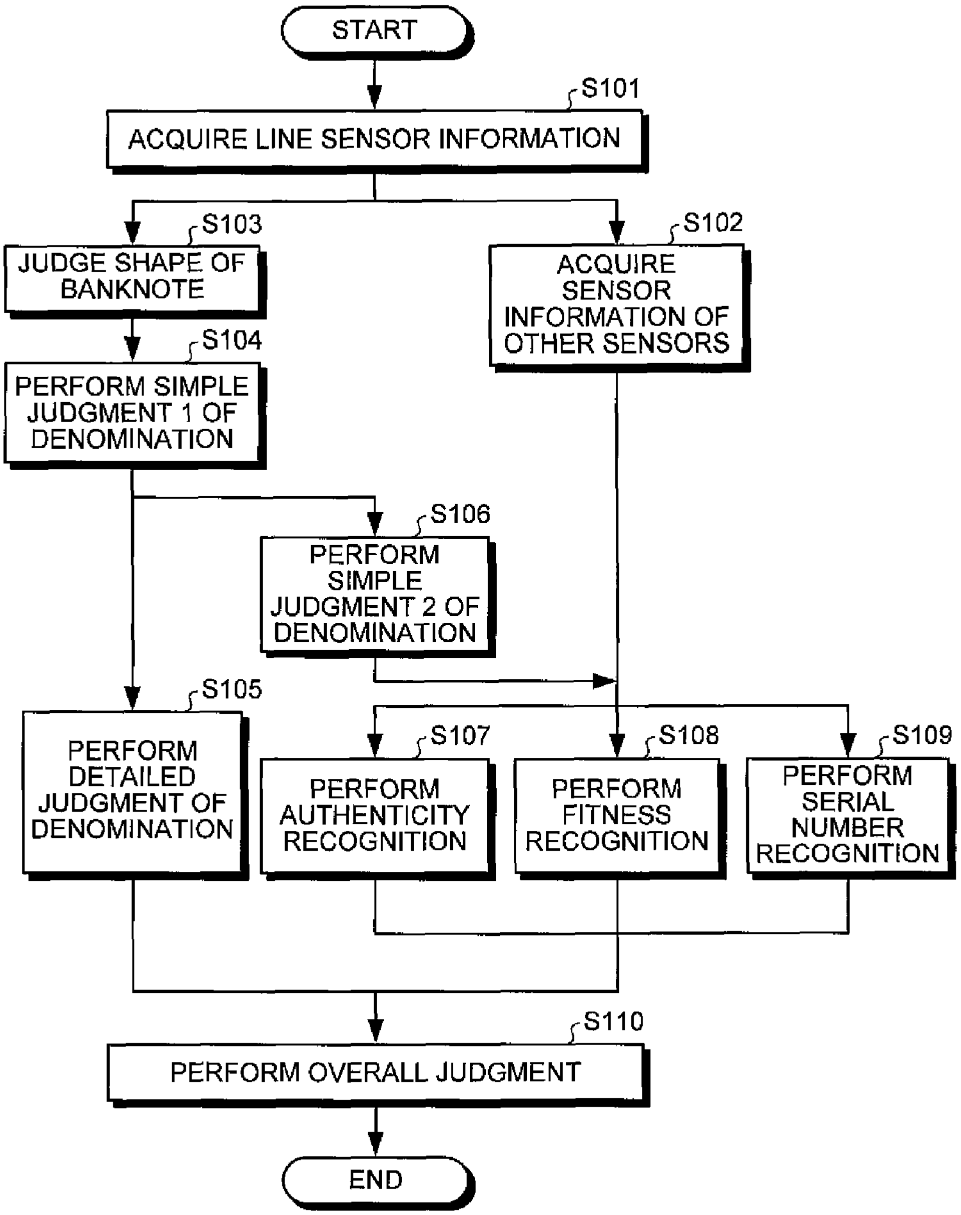
FIG. 10 is a flowchart for explaining a banknote recognition process procedure performed by the banknote recognition apparatus.

Processes performed by the paper-sheet recognition apparatus and the paper-sheet recognition method according to the present embodiment are explained below with reference to FIG. 10. FIG. 10 is a flowchart for explaining an overview of a banknote recognition process procedure performed by the banknote recognition apparatus 10.

As shown in FIG. 10, the line sensor 112 captures an image of the recognition target banknote that is deposited in the inlet and the sensor-information acquisition unit 131 acquires line sensor information that is the image data of the banknote (Step S101). Furthermore, the sensor-information acquisition unit 131 acquires the sensor information detected by the other sensors in the sensor group 11 (Step S102).

Thereafter, concurrently with Step S102, the shape judging unit 132*a* narrows down the denomination candidates by the shape judgment process of the banknote based on the line sensor information acquired at Step S101 (Step S103).

The simple judgment unit A 132*b* performs, based on the rough image, the simple judgment 1 of the denomination candidates narrowed down at Step S103, and narrows down the number of the denomination candidates to four (Step S104). The detailed denomination judging unit 132*d* performs the detailed denomination judgment based on the detailed image and identifies one denomination (Step S105).

Meanwhile, the simple judgment unit B 132*c* performs the simple judgment 2 as to the denomination candidates remaining after Step S104, and narrows down the number of the denomination candidates to two (Step S106).

The control unit 13 issues an instruction to the authenticity recognition unit 133 to perform the authenticity recognition process as to all the denomination candidates narrowed down at Step S106 concurrently with the detailed denomination judgment being performed at Step S105. The authenticity recognition unit 133 performs the authenticity recognition process (Step S107).

The control unit 13 issues an instruction to the fitness recognition unit 134 to perform the fitness recognition process as to all the denominations narrowed down at Step S106 concurrently with the detailed denomination judgment being performed at Step S105. The fitness recognition unit 134 performs the fitness recognition process (Step S108).

The control unit 13 issues an instruction to the serial-number recognition unit 135 to perform the serial-number recognition process as to all the denomination candidates narrowed down at Step S106 concurrently with the detailed denomination judgment being performed at Step S105. The serial-number recognition unit 135 performs the serial-number recognition process (Step S109).

Eventually, by obtaining a logical product, etc., of the judgment result obtained at Step S105, the authenticity recognition result obtained at Step S107, the fitness recognition result obtained at Step S108, and the serial-number recognition result obtained at Step S109, an overall judgment is performed (Step S110) and the result is output, and a series of the banknote recognition process procedure performed by the banknote recognition apparatus 10 is ended.

With respect to the overall judgment, for example, a denomination that is identified from the two denomination candidates obtained after the authenticity judgment and the fitness judgment can be used. A similar process can be performed for the serial number, or a serial number that is normally recognized can be used for the overall judgment.

In some banknotes of different denominations, the printing positions of the serial numbers are the same in some case. In such cases, there is no need to read the serial numbers of both the denomination candidates narrowed down at Step S106; if the serial number can be read based on the information relating to one denomination candidate, the serial number of the other denomination need not be read. If the serial numbers of the first denomination candidate and the second denomination candidate have characters of the same attributes at the same positions, the process can be ended just by reading the serial number based on the serial number information of the first denomination candidate.

As described above, in the paper-sheet recognition apparatus and the paper-sheet recognition method according to the present embodiment, the paper-sheet information including the image data of the paper sheet is acquired, types of the paper sheet are narrowed down based on the image data included in the paper-sheet information, one type is determined from the narrowed down types based on the image data included in the paper-sheet information, the authenticity of each narrowed down type of the paper sheet is recognized, an instruction is issued such that a type determination process and the authenticity recognition process are concurrently performed, and the final judgment on the paper sheet is made by combining the type and the authenticity result(s) corresponding to the type(s) from among the recognized authenticity results. Consequently, in the paper-sheet recognition apparatus and the paper-sheet recognition method, the recognition processing speed of the banknote can be increased and the total processing amount of the recognition process can be reduced.

In the claims according to the present invention, as an example, the paper-sheet recognition apparatus corresponds to the banknote recognition apparatus 10, a paper-sheet information acquisition unit corresponds to the sensor-information acquisition unit 131, paper-sheet type candidates narrowing-down units correspond to the shape judging unit 132*a*, the simple judgment unit A 132*b*, and the simple judgment unit B 132*c* of the denomination recognition unit 132, a type determining unit (132*d*) corresponds to the detailed denomination judging unit 132*d*, an authenticity recognition unit corresponds to the authenticity recognition unit 133, an execution instructing unit corresponds to the control unit 13, and a final judgment unit corresponds to the overall judgment unit 136.

In the embodiment according to the present invention, the banknote recognition apparatus installed in the financial establishment, such as, a bank, is explained. However, the present invention is not to be thus limited. The present invention is applicable not only when banknotes are to be recognized but also when paper sheets, such as, gift coupons handled in department stores, gift certificate shops, etc., are to be recognized. The present invention is applicable not only when the banknotes are to be recognized but also when coin are to be recognized.

INDUSTRIAL APPLICABILITY

As described above, the paper-sheet recognition apparatus and the paper-sheet recognition method according to the present invention are useful for increasing the speed of the recognition processing of the paper sheet, and particularly, for reducing the total processing amount of the recognition process performed by the paper-sheet recognition apparatus.

EXPLANATIONS OF LETTERS OR NUMERALS

10: Banknote recognition apparatus
11: Sensor group
111: Timing sensor
111-1: Timing sensor
111-1*a*: Light receiving unit
111-1*b*: Light emitting unit
111-2: Timing sensor
111-2*a*: Light emitting unit
111-2*b*: Light receiving unit
112: Line sensor
112*a*: Light emitting unit
112*b*: Light receiving unit
113: Fluorescence sensor
114: Thickness sensor
114*a*: Detection shaft
114*b*: Detection shaft
115: Magnetic sensor
115*a*: Magnetic head
115*b*: Roller
12: Storage unit
121: Shape information
122: Template
123: Threshold value
13: Control unit
131: Sensor-information acquisition unit
132: Denomination recognition unit
132*a*: Shape judging unit
132*b*: Simple judgment unit A
132*c*: Simple judgment unit B
132*d*: Detailed denomination judging unit
133: Authenticity recognition unit
134: Fitness recognition unit
135: Serial-number recognition unit
136: Overall judgment unit

The invention claimed is:

1. A paper-sheet recognition apparatus that recognizes a paper sheet, the paper-sheet recognition apparatus comprising:

a paper-sheet information acquisition unit that acquires paper-sheet information including an image data of the paper sheet;

a candidate narrowing-down unit that narrows down a number of type candidates of the paper sheet to a small number of types based on the image data included in the paper-sheet information;

a type determining unit that determines one type from the type candidates narrowed down by the candidate narrowing-down unit based on the image data included in the paper-sheet information;

an authenticity recognition unit that recognizes authenticity of the paper sheet as to each of the type candidates narrowed down by the candidate narrowing-down unit;

an execution instructing unit that issues an instruction such that the type determining unit and the authenticity recognition unit are operated concurrently; and a final judgment unit that performs a final judgment on the paper sheet by combining the type determined by the type determining unit and an authenticity recognition result corresponding to the type from among authenticity recognition results of the candidate types recognized by the authenticity recognition unit.

2. The paper-sheet recognition apparatus according to claim 1, further comprising:

a fitness recognition unit that recognizes fitness of the paper sheet as to the small number of type candidates narrowed down by the candidate narrowing-down unit, wherein the execution instructing unit issues an instruction such that the fitness recognition unit and the type determining unit are operated concurrently.

3. The paper-sheet recognition apparatus according to claim 1, further comprising:

a code recognizing unit that acquires a partial image of a part including a unique code identifying the paper sheet from the image data, and performs character recognition of the acquired partial image, wherein the execution instructing unit issues an instruction such that the code recognition unit and the type determining unit are operated concurrently.

4. The paper-sheet recognition apparatus according to claim 1, wherein the candidate narrowing-down unit narrows down the number of the type candidates based on a shape of the paper sheet.

5. The paper-sheet recognition apparatus according to claim 1, wherein the type determining unit handles the image data in units of blocks of a predetermined size, each block being a set of pixels, and determines one type based on the block, and the candidate narrowing-down unit handles the image data in the units of blocks, each block being larger than the predetermined size, and narrows down the number of type candidates of the paper sheet based on the block.

6. The paper-sheet recognition apparatus according to claim 1, wherein the candidate narrowing-down unit acquires an amount of features acquired for each wavelength irradiating the paper sheet with lights of different wavelengths, and narrows down the number of the type candidates of the paper sheet by comparing the amount of features acquired for each wavelength with an amount of features stored previously for each wavelength.

7. A paper-sheet recognition method that is applied in a paper-sheet recognition apparatus that recognizes a paper sheet, the method comprising:

acquiring paper-sheet information that includes an image data of the paper sheet;

narrowing down a number of type candidates of the paper sheet to a small number of types based on the image data included in the paper-sheet information;

determining one type from the type candidates narrowed down at the narrowing down based on the image data included in the paper-sheet information;

recognizing authenticity of the paper sheet as to each type candidate narrowed down at the narrowing down;

issuing an instruction such that determining of the type and recognizing the authenticity are performed concurrently; and performing a final judgment of the paper sheet by combining the type determined at the determining and an authenticity recognition result corresponding to the type from among authenticity recognition results as to the candidate types recognized at the recognizing.

* * * * *